United States Patent Office 2,976,140
Patented Mar. 21, 1961

2,976,140
PROCESS FOR PRODUCING AMMONIATED PHOSPHATIC FERTILIZERS

John N. Carothers and Rudolph J. Hurka, Jr., both of 1629 Lady Marion Lane NE., Atlanta, Ga.

No Drawing. Filed Feb. 18, 1955, Ser. No. 489,266

11 Claims. (Cl. 71—40)

This invention relates in general to a process for the production of a fertilizer material, and more particularly to the production of a highly "available" phosphate, in which neutralizing ammonia is added to acidulated phosphate rock, in such quantities as have heretofore been considered impossible without the formation of substantial quantities of objectionable "reverted" or citrate insoluble $P_2O_5$ which is not available for use as a fertilizer.

In this specification, by the term "neutralizing ammonia" we mean free ammonia, as contrasted with combined ammonia in a salt. And by "general excess of ammonia" we means an excess of that required to react with the acidic hydrogen. By "acidulated phosphate rock" we mean phosphate rock, prepared according to the method outlined in this disclosure. By the term "superphosphate" we mean the product of commerce known by that name and as heretofore produced by acidulating phosphate rock with sulfuric acid. Also, throughout this specification where "parts" are mentioned, parts by weight are intended. By the term "available" phosphate is meant the total $P_2O_5$ content of the product less the citrate insoluble $P_2O_5$ content.

The principal objects of this invention are to provide a process for producing ammoniated phosphate, which shall be higher in ammonia content than heretofore obtained and be prepared by the addition of neutralizing ammonia to acidulated phosphate rock in such a manner as to convert substantial quantities of water soluble $P_2O_5$ into water insoluble $P_2O_5$, yet be in a form which is citrate soluble and available for use as a fertilizer; also, to react the ammonia with substantially all of the acid required for acidulation of the phosphate rock, except that required to react with the carbonates, fluorides and minor other impurities.

A further object of our invention is to produce an ammoniated phosphate, having a high available $P_2O_5$ content, yet being low in calcium sulfate content and containing a minimum amount of acidic hydrogen.

Another object of our invention is to produce a phosphatic fertilizer containing ammonium sulfate and calcium phosphate in which the calcium phosphate is water insoluble and citrate soluble and has approximately the ratio of Ca to $P_2O_5$ found in tricalcium phosphate.

A still further object of our invention is to add neutralizing ammonia only to acidulated phosphate rock, in such quantities that in the final product, the units of ammonia per 20 units of $P_2O_5$ may be in excess of 11, and which shall contain only small quantities of unavailable $P_2O_5$.

Another object of our invention is to provide a process in which acidulated phosphate rock is ammoniated to a higher percentage of ammonia than heretofore achieved without first removing the fluorine contained in the phosphate rock.

Another object of this invention is to provide a process of producing from phosphate rock, in the presence of substantially all the fluorine originally present in the rock, a product containing a higher percentage of ammonia than has heretofore been achieved and in which substantially all of the $P_2O_5$ in the product is citrate soluble.

And an additional object is the ammoniation of acidulated phosphate rock to form a citrate soluble phosphate, which shall be more basic than dicalcium phosphate, and which shall be formed along with the ammonium salt produced during the ammoniation.

The addition of neutralizing ammonia in appreciable quantities to ordinary superphosphate dates from about 1929. The quantity of neutralizing ammonia which is added, averages 2.5 parts per 20 parts $P_2O_5$. Kumagi et al., Journal of Agricultural and Food Chemistry, vol. 2, January 6, 1954. This article on page 25 states: "However there is a dearth of published information on ammoniation technique, optimum conditions for ammoniation, and the influence of physical properties of raw materials on ammonia absorption." A great deal of research has been undertaken to find out just what reactions occur when ammonia is added to ordinary superphosphate. Since the addition of ammonia was first begun commercially there has been only a limited increase in quantities of ammonia added per unit of $P_2O_5$ and this increase has been attained mainly through manipulative procedure, including the addition of ammonium salts, and not because of basic changes in the process, or control of the reactions which cause reversion.

When the ammoniation of superphosphate was first begun, the investigators expressed the reactions in four principal equations as shown below, which are still generally accepted as representing what occurs when ordinary superphosphate is fully ammoniated:

(1) $H_3PO_4 + NH_3 = NH_4H_2PO_4$
(2) $Ca(H_2PO_4)2.H_2O + NH_3 = CaHPO_4$
$+ NH_4H_2PO_4 + H_2O$
(3) $NH_4H_2PO_4 + CaSO_4 + NH_3 = CaHPO_4 + (NH_4)_2SO_4$
(4) $2CaHPO_4 + CaSO_4 + 2NH_3 = Ca_3(PO_4)_2$
$+ (NH_4)_2SO_4$

Heretofore in ammoniating ordinary superphosphate it has been generally regarded that dicalcium phosphate was formed from the water soluble $P_2O_5$ and such free acid as was present and that the formation of dicalcium phosphate represented the maximum possible ammonia addition without forming undesirable citrate insoluble $P_2O_5$, commonly referred to as tricalcium phosphate. This opinion has found expression in many technical reports of work done, and in patents (see Kumagi et al. supra and references there cited). The desirability of increasing the amount of ammonia that could be added has found expression in much technical literature and attempts to accomplish it have been the subject of many investigations.

Notwithstanding the generally prevailing opinion that dicalcium phosphate is the first water insoluble, available calcium phosphate formed during the ammoniation of superphosphate, and upon further ammoniation that citrate insoluble tricalcium phosphate is formed, as illustrated by Equations 2, 3 and 4, above, we believe there is evidence that indicates that a water insoluble, available phosphate more basic than dicalcium phosphate is formed at all stages of ammoniation of acidulated phosphate rock.

A great deal of research work has been done in trying to determine the causes of reversion of available phosphates to the citrate insoluble form. Some reports state that fluorine is the main cause of reversion, and the fluoapatite is formed, while others report the compound of reverted $P_2O_5$ as being hydroxy apatite. (Datin et al., Ind. and Eng. Chem., vol. 44, p. 903 et seq. (1952); Hecht et al., Ind. and Eng. Chem., vol. 44, p. 1119 et seq. (1952); Jacob et al., Ind. and Eng. Chem., vol. 22, p. 1385 (1930); Keenan, Ind. and Eng. Chem., vol. 22, p. 1378 (1930).)

Various proposals have been made to overcome reversion of $P_2O_5$ in the ammoniation of superphosphate. For example, it has been proposed to add ammonium salts, such as the sulfate and the nitrate and to cool the ammoniated product before storage. Some of the most recent reports conclude that the best way to avoid reversion is to remove the fluorine before ammoniation; however that conclusion is followed by the statement that no economically feasible way to do so is known.

In the current manufacture of ordinary superphosphate it is the general practice to acidulate phosphate rock with sulfuric acid of such strength that as the mix goes to the storage pile for curing it may contain as much as 15% moisture. While curing it is customary to aerate the product by dropping the material from a considerable height either by means of dump cars located on an elevated track near the top of the storage building or by dropping it from a crane bucket. This facilitates the escape of water vapor and tends to cool the freshly prepared product. (Waggaman, Phosphoric Acid Phosphates and Phosphatic Fertilizers, Second Edition, page 270.) Acid of varying strengths are used, which generally range between 50° and 56° Bé., being from 62% to 71% $H_2SO_4$. The variations in acid strength, and the proportions of acid to rock, depend on the grade and kind of phosphate rock being acidulated, and also on the preferred operating practice at a given plant.

In calculating acid requirements for superphosphate, as heretofore produced, consideration has been given to provide only sufficient acid to make the $P_2O_5$ in the rock available, part of which was water soluble, and part of which water insoluble, yet citrate soluble. Shoeld et al., Ind. and Eng. Chem., vol. 41, page 1334 et seq. (1949); Marshall et al., Ind. and Eng. Chem., vol. 32, p. 1128 (1940). Taking into consideration both the cost of the acid used in the acidulation and the cost of the phosphate rock the process is operated in a way to keep the cost of available $P_2O_5$ at a minimum.

It has not been recognized heretofore that varying the ratio of acid to rock when acidulating phosphate rock has any effect on the ammoniation of the superphosphate. Nor has it been recognized that varying the acid to phosphate rock acidulating ratio, has any effect on conditioning of the superphosphate for ammoniation, when curing conditions were also varied. The influence of temperature during ammoniation of acidulated phosphate rock, likewise has never been fully appreciated.

We have discovered that while phosphate rock acidulated on the acid to rock ratio used in making ordinary superphosphate may be ammoniated to an ammonia content higher than heretofore realized, while retaining high $P_2O_5$ availability, there are advantages to ammoniating an acidulated phosphate rock which is made with more than the minimum ratio of acidulating acid to rock. We have discovered that by increasing the acid to phosphate rock ratio in acidulation, we are able to add larger quantities of $NH_3$ to the acidulated rock under conditions which cannot be used at lower ratios, and we are able to make a product in which the water soluble fraction of the $P_2O_5$ is less, and thereby avoid undesirable ill effects which occur from soil reversion of water soluble $P_2O_5$.

In accordance with our improved process we may add as much as 9.2 parts $NH_3$ to 20 parts $P_2O_5$ to phosphate rock acidulated on the acid to rock ratio used in making ordinary superphosphate and as much as 12 parts $NH_3$ to 20 parts $P_2O_5$ to phosphate rock acidulated in the manner hereinafter set forth and produce a product in which the $P_2O_5$ is over 97% available.

The phosphate rock may be acidulated in conventionally used equipment by mixing the dry phosphate rock with sulfuric acid, which has been diluted to a strength of from 60% to 75% $H_2SO_4$ and which will give a moisture content of from 6% to 25% in the end product after aging; or the phosphate rock may be moistened with water, and a somewhat more concentrated acid may be used than would be the case if dry phosphate rock is acidulated.

For example, when using Florida pebble phosphate rock having 34% $P_2O_5$, and 3.7% F, we preferably use the equivalent of 70 pounds $H_2SO_4$ and 42 pounds water, per 100 pounds phosphate rock or 2.06 pounds $H_2SO_4$ (100% basis) for 1 pound $P_2O_5$ in the rock. This is 80% of the 2.57 pounds $H_2SO_4$ per pound $P_2O_5$ required to convert the $P_2O_5$ in high grade rock to phosphoric acid. (Waggaman, Phosphoric Acid Phosphates and Phosphatic Fertilizers, 2nd Edition, page 216). As will be shown in the specific examples hereinafter set forth, a lesser proportion of acid to rock may be employed. Of course it is obvious to those skilled in the manufacture of ordinary superphosphate, that various sizes of the mix and the temperature of materials being used necessitate changes in the quantity of water used. We have found that these proportions of phosphate rock and acid give substantially complete solubilization of the phosphate rock, and renders the $P_2O_5$ content of the rock substantially completely water soluble with some free phosphoric acid. A still higher acid to phosphate rock ratio could be employed but it would be economically undesirable.

The acidulated mix should be aged for a week or longer either at a temperature which may be above 80° C., or at lower temperatures down to atmospheric temperature. As will be seen in the examples which follow, the temperature at which the mix is aged may vary the manner in which it may later be ammoniated. After such aging it is ready for ammoniation. During the aging step we believe that substantial quantities of the fluorine in the rock react to form highly insoluble compounds, such as are described in our copending application Serial No. 424,931, filed April 22, 1954, and now abandoned, which compounds are subsequently unaffected in the ammoniation. In any event the aging of the material should take place without substantial drying whereby it will contain from 6% to 25% moisture after aging as set forth above.

When the acidulated mix is aged for one week or longer at a temperature above 80° C., it can then be ammoniated at a temperature below 70° C., and the ammoniated product dried at temperatures in the neighborhood of 100° C. immediately after ammoniation. A product is thus obtained containing up to 12.1 parts $NH_3$ per 20 parts $P_2O_5$ in which the $P_2O_5$ is about 98% available, and 1%–2% water soluble.

When the acidulated mix is aged for a week or longer, at temperatures in the neighborhood of atmospheric temperature, it can be ammoniated at temperatures below 70° C., and if allowed to react for a period of several hours below 70° C., it can then be dried at any desired temperature, including temperatures in the neighborhood of 100° C. A product is thus obtained containing up to 12.1 parts $NH_3$ per 20 parts $P_2O_5$ in which the $P_2O_5$ is about 98% available, and 1–2% water soluble. We have allowed the material to react for a period of 1 hour and upon drying obtained a product in which the $P_2O_5$ was 94% available. Where the material reacted for 18 hours before being dried the $P_2O_5$ was 98% available.

We have found that when the acidulated mix which has aged for a week or longer at temperatures in the neighborhood of atmospheric temperature is heated or dried at temperatures in the neighborhood of 100° C. immediately after ammoniation, reversion of $P_2O_5$ occurs. A product is thus obtained containing up to 12.2 parts $NH_3$ per 20 parts $P_2O_5$ in which the $P_2O_5$ is only about 90% available and about 1% water soluble. Higher availability may be obtained from such material however, by the addition of approximately 12% calcium sulfate and 12% ammonium sulfate to the mixture before ammoniation.

We have carried out our improved process in many tests, examples of which will be hereinafter described and have observed no ill effects from a local excess of ammonia. For example, we have added ammonia until a general excess was present, and the resulting product had a high ratio of $NH_3$ to $P_2O_5$, and a high percentage of available $P_2O_5$. Heat is developed when $NH_3$ is added to acidulated phosphate rock. The extent to which the ammoniated mass heats, depends upon the temperature of the starting materials, whether more or less water is evaporated, and upon the means of ammoniation; for instance whether an ammoniating solution or gaseous ammonia is used. It is obvious that the average temperature of the mass is lower than the temperature in the region where the ammoniation reaction occurs. In any event the temperature during ammoniation should not be allowed to exceed 75° C.

We are unable to explain the reactions which take place, whereby such large quantities of ammonia can be added to the acidulated phosphate without forming objectionable quantities of unavailable $P_2O_5$. Nevertheless, we have observed, by repeated tests, that in carrying out our improved process as herein outlined, 11 units and above of ammonia per 20 units of $P_2O_5$, can be added without forming objectionable quantities of citrate insoluble $P_2O_5$.

By means of our improved process, we are able to make more efficient use of the sulfuric acid employed to solubilize the phosphate rock than has heretofore been attained in that we make an available phosphate, and convert the major portion of the sulfate in the calcium sulfate into ammonium sulfate by the use of ammonia with the acidulated phosphate rock as will be shown by the examples hereinafter set forth.

We are enabled by means of our improved process to make a citrate soluble form of $P_2O_5$ from the phosphate content of phosphate rock with the net expenditure of less sulfuric acid than would be needed to make dicalcium phosphate from the tricalcium equivalent of the phosphate rock. This is brought about by the fact that we utilize the calcium sulfate as a source of sulfate to make ammonium sulfate and utilize the major portion of the acid used in acidulating the phosphate rock subsequently to react with ammonia. Accordingly, we not only make a superior phosphate fertilizer, but obtain a great saving in raw materials.

In the examples which follow satisfactory ammoniation with a high $NH_3$ content was obtained with acidulated phosphate rock prepared in different ways. These examples include comparisons of conditions during the ammoniation of acidulated phosphate rock aged at temperatures above 80° C., with those during ammoniation of acidulated phosphate rock aged at atmospheric temperature. Also included are comparisons of methods of ammoniating acidulated phosphate rock, prepared with various ratios of acid to $P_2O_5$. In all of the examples which follow the average temperature of the mass during ammoniation was not allowed to exceed 75° C.

*Example 1*

Acidulated phosphate rock was prepared in the preferred manner hereinbefore outlined and contained 12.5% moisture and 17.9% $P_2O_5$ after being aged 16 days at a temperature between 85°–95° C.

To the above aged mixture, cooled to approximately 30° C. immediately before ammoniation, 27% aqua ammonia was added in an amount so that the final dry product contained 9.8% ammonia, and had a total of 12.0 parts $NH_3$ per 20 parts $P_2O_5$. The $P_2O_5$ in the final dry product was 97.9% available and 1.5% water soluble. In this example 84% of the $H_2SO_4$ used to acidulate the phosphate rock was subsequently utilized to react with ammonia. After ammoniation the mixture was heated for about 4.5 hours in the neighborhood of 100° C. during which time the excess water was evaporated. It will thus be seen that under conditions heretofore considered adverse there was no appreciable reversion of the $P_2O_5$ to citrate insolubility.

*Example 2*

The following mixture was prepared:

101.6 parts acidulated phosphate rock prepared in the preferred manner hereinbefore outlined, containing 18% moisture and 1.75% fluorine, and aged at room temperature.
12.0 parts ammonium sulfate, and
12.6 parts calcium sulfate, dihydrate.

To the above mixture ammonia was added, as 28% aqua, in an amount so that the resultant dry product contained 10.6% $NH_3$, and had a total of 15 parts ammonia to 20 parts $P_2O_5$, of which 11.4 parts $NH_3$ to 20 parts $P_2O_5$ was added as free ammonia. The $P_2O_5$ in the product was over 99% available, and 3.2% water soluble.

In adding the ammonium sulfate, 3 parts were dissolved in the aqua ammonia before it was added to the acidulated phosphate rock. The calcium sulfate was all thoroughly mixed into the acidulated phosphate rock before the ammonia was added. After the ammonia was added to the mixture it was heated in the neighborhood of 95–100° C. for about 1 hour, and the excess water was then evaporated. It will thus be seen that although heated for a considerable period of time at a high moisture, high ammonia content, there was no material reversion.

The amount of ammonia thus added was sufficient to neutralize substantially all of the acidic hydrogen in the mixture. It will be apparent however that lesser amounts of ammonia may be employed where a final product of lower ammonia content is being made.

*Example 3*

To acidulated phosphate rock, prepared in the preferred manner hereinbefore outlined, and containing 15% moisture and 17.1% $P_2O_5$, after being aged at atmospheric temperature for 25 days, 27% aqua ammonia was added in an amount to provide $NH_3$ in excess of that required to react with the acidic hydrogen in the mixture. The temperature was maintained below about 60° C. during the ammonia addition. The mixture stood 48 hours in the presence of the excess $NH_3$, at temperatures in the neighborhood of atmospheric temperature. It was then dried at temperatures in the neighborhood of 45° C. The $P_2O_5$ in the final dried product was 99.4% available and 3.9% water soluble. The $NH_3$ content of the final dried product was 11.7 parts $NH_3$ per 20 parts $P_2O_5$. In this example approximately 82% of the acid used to acidulate the phosphate rock was subsequently utilized to react with $NH_3$. It will thus be seen that although the mixture was subjected to excess ammonia for a considerable period of time, a condition heretofore considered adverse, there was obtained a product having a higher ammonia content with higher availability than heretofore considered possible.

*Example 4*

To acidulated phosphate rock, prepared in the preferred manner hereinbefore outlined, containing 15% moisture and 17.1% $P_2O_5$, after being aged at atmospheric temperature for 50 days, 27% aqua ammonia was added in an amount to provide $NH_3$ in excess of that required to react with the acidic hydrogen in the mixture. The temperature was maintained below about 55° C. during the ammonia addition. After the mixture stood for 18 hours in the presence of the excess $NH_3$, at temperatures in the neighborhood of atmospheric temperature, it was divided into two portions. One portion of the mixture was heated to and dried at a temperature in the neighborhood of 100° C. The $P_2O_5$ in the final dried product was 97.5% available and 1.5% water soluble. The ammonia content of the final dried product was 12.1 parts $NH_3$ per 20 parts $P_2O_5$. In this example approximately 85% of the acid used to acidulate the phosphate rock was subsequently utilized to react with $NH_3$.

The second portion of the ammoniated material was heated to and dried at a temperature in the neighborhood of 45° C. The $P_2O_5$ in the final dried product was 99% axailable and 2.5% water soluble. The ammonia content of the final dried product was 11.5 parts $NH_3$ per 20 parts $P_2O_5$. In this example approximately 81% of the acid used to acidulate the phosphate rock was subsequently utilized to react with $NH_3$.

Example 5

Phosphate rock was prepared in the preferred manner hereinbefore outlined, except that the concentration of the sulfuric acid used for the acidulation was 74.7%. The acidulated rock contained 8.3% moisture and 18.4% $P_2O_5$ after being aged 29 days at temperatures between 85° C. and 95° C. To this material cooled to approximately 40° C. immediately prior to ammoniation 27% aqua ammonia was added in an amount to provide $NH_3$ in excess of that required to react with the acidic hydrogen in the mixture. Immediately after ammoniation, the mixture was divided into two portions, one being heated to and dried at temperatures in the neighborhood of 100° C. and the other at temperatures in the neighborhood of 45° C. In the portion dried at about 100° C. the $P_2O_5$ in the final dried product was 98% available and 1.3% water soluble. The ammonia content of the final dried product was 12.1 parts $NH_3$ per 20 parts $P_2O_5$. Thus approximately 85% of the acid used in acidulating the phosphate rock was subsequently utilized to react with $NH_3$.

In the portion dried at about 45° C. the $P_2O_5$ in the final dried product was 99% available and 1.5% water soluble. The ammonia content of the final dried product was 11.9 parts $NH_3$ per 20 parts $P_2O_5$. Thus approximately 83% of the acid used in acidulating the phosphate rock was subsequently utilized to react with $NH_3$. It will thus be seen that acidulated phosphate rock, aged at temperatures between 85° and 95° C. and ammoniated at temperatures below 70° C., may be heated to a temperature of around 100° C. and dried immediately after ammoniation without material reversion.

Example 6

Phosphate rock was acidulated in the manner set forth in Example 5 and contained 7.4% moisture and 18.6% $P_2O_5$, after being aged 41 days at temperatures between 85° C. and 95° C. To this material, cooled to about 42° C. immediately prior to ammoniation, 27% aqua ammonia was added in an amount somewhat less than that of Example 5. Immediately after ammoniation, the material was divided into two portions, one being heated to and dried at temperatures in the neighborhood of 100° C. and the other at a temperature in the neighborhood of 45° C. In the portion dried at about 100° C., the $P_2O_5$ in the final dried product was 97.5% available and 19.9% water soluble. The ammonia content of the final dried product was 10.1 parts $NH_3$ per 20 parts $P_2O_5$. Thus approximately 71% of the acid used in acidulating the phosphate rock was subsequently utilized to react with $NH_3$.

In the portion dried at about 45° C., the $P_2O_5$ in the final dried product was 98.7% available and 19% water soluble. The ammonia content of the final dried product was 10.1 parts $NH_3$ per 20 parts $P_2O_5$. Thus approximately 71% of the acid used in acidulating the phosphate rock was subsequently utilized to react with $NH_3$.

The foregoing results, in comparison with those of Example 5 shows the effect of the smaller quantity of $NH_3$ in the final dried product on the water solubility of the $P_2O_5$ of the product and that our process may be carried out as well with a smaller quantity of ammonia as with an excess of ammonia.

Example 7

To acidulated phosphate rock, prepared in the preferred manner hereinbefore outlined, and containing 15% moisture and 17.1% $P_2O_5$ after being aged at atmospheric temperature for 26 days, 27% aqua ammonia was added in an amount to provide $NH_3$ in excess of that required to react with the acidic hydrogen in the mixture. The temperature was maintained below about 55° C. during the ammonia addition. Immediately after ammoniation the mixture was heated to and dried at about 100° C. The $P_2O_5$ in the final dried product was only 91.6% available and 0.7% water soluble. The ammonia content of the final dried product was 12.2 parts $NH_3$ per 20 parts $P_2O_5$. Thus approximately 85% of the acid used in acidulating the phosphate rock was subsequently utilized to react with $NH_3$.

The results in this example show the ill effect of high temperature immediately after ammoniation when using an acidulated phosphate rock aged at atmospheric temperature in contrast with the results obtained in Examples 3 and 4 where the ammoniated mixture was allowed to stand for a considerable period of time before drying. The results may also be compared with those obtained in Example 5 where the material was aged at temperatures of from 85° C. to 95° C. and was heated to a temperature of 100° C. immediately after ammoniation with no appreciable reversion.

Example 8

Phosphate rock was acidulated in the preferred manner hereinbefore outlined, and contained 12.5% moisture and 17.9% $P_2O_5$ after being aged 18 days at temperatures between 85° C. and 95° C. To this material after being cooled to approximately 40° C., 27% aqua ammonia was added in an amount to provide $NH_3$ in excess of that required to react with the acidic hydrogen in the mixture. After the mixture stood 48 hours in the presence of the excess $NH_3$, it was dried at about 45° C. The $P_2O_5$ in the final dried product was 99.2% available and 5.1% water soluble. The ammonia content of the final dried product was 11.4 parts $NH_3$ per 20 parts $P_2O_5$. Thus 80% of the acid used to acidulate the phosphate rock was subsequently utilized to react with $NH_3$. In this example in contrast with Example 5, the ammoniated product was allowed to stand for two days in the presence of an excess of ammonia without appreciable reversion.

Example 9

Phosphate rock was acidulated in the preferred manner hereinbefore outlined, and was aged at atmospheric temperature for 34 days. To this material 27% aqua ammonia was added in an amount to provide about one-third of the total $NH_3$ to be added. The partially ammoniated product was placed in a closed vessel and $NH_3$ gas was added. During the gaseous ammoniation, the temperature of the mass was kept below about 40° C. After ammoniation the product was dried at about 45° C. The $P_2O_5$ in the final dried product was 99.6% available and 7.1% water soluble. The ammonia content of the final dried product was 11.2 parts $NH_3$ per 20 parts $P_2O_5$. Thus 78% of the acid used in acidulating the phosphate rock was subsequently utilized to react with $NH_3$. This example demonstrates that our improved process may be carried out equally well with aqueous ammonia or gaseous ammonia.

It will also be apparent from the preceding examples that whatever the causes of reversion in prior art processes which were attributed to excess moisture, or over ammoniation, such factors do not affect the availability of the $P_2O_5$ in our improved process.

The superphosphate of commerce is generally made by acidulating phosphate rock with sulfuric acid on a weight ratio ranging between 1.77 and 1.91 parts $H_2SO_4$ (100% basis) per part $P_2O_5$ contained in high grade phosphate rock or from 60 to 65 pounds $H_2SO_4$ to 100 pounds high grade phosphate rock. The $P_2O_5$ in such a product is substantially completely available and upwards of 85% water soluble. We have discovered that such acidulated phosphate rock, may be successfully ammoniated in accordance with our improved process to an ammonia content of from 9 to 10 parts $NH_3$ per 20 parts $P_2O_5$, with the $P_2O_5$ content of the product being up to 99% available.

In the examples which follow, we set forth the manner in which this ammoniation may be accomplished. Later we give an example of the results if improper conditions are employed.

Example 10

To an acidulated phosphate rock, prepared with 50° Bé. sulfuric acid, using 1.77 parts $H_2SO_4$ (100% basis) per one part $P_2O_5$ in high grade phosphate rock (or 60 pounds $H_2SO_4$ to 100 pounds of rock) and aged 60 days at atmospheric temperature, 27% aqua ammonia was added in an amount to provide $NH_3$ in excess of that required to react with the acidic hydrogen in the mixture. During the ammoniation the temperature was kept between 50° and 55° C., and higher temperatures were prevented by evaporation of water. The ammoniated mixture stood 72 hours at atmospheric temperature in the presence of the excess ammonia and was then dried at a temperature below 45° C. The $P_2O_5$ in the final dried product was 99% available and 4.9% water soluble. The ammonia content of the final dried product was 9.5 parts $NH_3$ per 20 parts $P_2O_5$. Thus about 77% of the acid used in acidulating the phosphate rock was subsequently utilized to react with $NH_3$.

In another case in which the ammoniated mixture stood 48 hours after ammoniation and before drying the $P_2O_5$ of the final dried product was over 99% available and 5% water soluble. The final dried product in this case had an ammonia content of 9.2 parts $NH_3$ per 20 parts $P_2O_5$. Thus about 75% of the acid used in acidulating the phosphate rock was subsequently utilized to react with $NH_3$

Example 11

To an acidulated phosphate rock, prepared with 50° Bé. sulfuric acid using 1.77 parts $H_2SO_4$ (100% basis) per one part $P_2O_5$ (or 60 parts $H_2SO_4$ to 100 parts high grade phosphate rock) and aged 18 days at temperatures between 85° and 95° C., and cooled to approximately 40° C. immediately prior to ammoniation, 27% aqua ammonia was added in an amount to provide $NH_3$ in excess of that required to react with the acidic hydrogen in the mixture. During the ammoniation the temperature was kept between 50° and 55° C. and higher temperatures were prevented by evaporation of water. Immediately after ammoniation, the mixture was heated to and dried at about 100° C. The $P_2O_5$ in the final dried product was only 82% available, and was 22.5% water soluble. The $NH_3$ content of the final dried product was only 7.4 parts $NH_3$ per 20 parts $P_2O_5$. Thus only about 60% of the acid used in acidulating the phosphate rock was subsequently utilized to react with $NH_3$, and the loss of availability of the $P_2O_5$ was high. In this example where the acid to phosphate rock ratio is that employed in making ordinary superphosphate, although there was a general excess of $NH_3$, the reaction of the acidulated phosphate rock with the $NH_3$ gave a disproportionately lower ammonia content of the product, expressed as parts $NH_3$ per 20 parts $P_2O_5$, than in Example 1, where a higher ratio of acid to rock was employed. Furthermore there was considerable reversion in this example and practically none in Example 1. This example shows that phosphate rock acidulated with an acid to rock ratio such as is employed in making ordinary superphosphate, if ammoniated and then heated or dried at a temperature of 100° C. or more will undergo considerable reversion.

Example 12

Acidulated phosphate rock, made with 50° Bé. sulfuric acid using 1.77 parts $H_2SO_4$ (100% basis) per one part $P_2O_5$ or 60 parts $H_2SO_4$ to 100 parts high grade phosphate rock, containing 17.8% $P_2O_5$ and 17.6% moisture after being aged 133 days at atmospheric temperature was ammoniated with anhydrous ammonia gas.

The $NH_3$ was added at a rate which permitted keeping the mass below about 45° C., and was absorbed during a period of about four hours. The mass was stirred intermittently during the ammoniation. Immediately after ammoniation a portion was dried at a temperature of about 45° C. The $P_2O_5$ in the dried product was over 99% available and 9.9% water soluble. The ammonia content of the product was 8.5 parts $NH_3$ per 20 parts $P_2O_5$. A second portion of the ammoniated mixture was kept in contact with the ammonia at atmospheric temperature for 60 hours and then dried at about 45° C. The $P_2O_5$ in this portion was over 99% available and 7.9% water soluble. The ammonia content of this portion was 9.0 parts $NH_3$ per 20 parts $P_2O_5$.

A third portion of the ammoniated mixture was kept in an ammonia atmosphere at atmospheric temperature for 40 days, and then dried at about 45° C. The $P_2O_5$ in the final dried product was about 97% available and 5.2% water soluble. The ammonia content of the dried product was 9.2 parts $NH_3$ per 20 parts $P_2O_5$.

In all of the foregoing examples, the acidulated phosphate rock contained substantially all the fluorine originally present in the rock which before acidulation averaged more than 3%. The only reduction in fluorine content was that normally occurring during acidulation.

While in all the foregoing examples we have used aqua ammonia or gaseous amomnia as the ammoniating agent it will be obvious to those skilled in the art that so called ammoniating solutions containing ammonia as well as other nitrogen compounds may be employed in our improved process and that the ammonia contained in such solutions will react with the phosphatic mixture in a similar manner to that herein described.

From the foregoing it will be seen that by aging the acidulated phosphate rock for a sufficient length of time and controlling the temperature of aging and during ammoniation and subsequent drying the maximum absorption of ammonia without reversion is obtained. It will also be seen that still more favorable results are obtained where the ratio of $H_2SO_4$ to phosphate rock in acidulation is such as to render substantially all the $P_2O_5$ water soluble. Further, it will be observed that under certain conditions another important factor is the proper aging of the ammoniated product before drying.

While we have described several ways in which our improved process may be successfully carried out, it will be obvious to those skilled in the art that it is not so limited but that it is susceptible of various changes and modifications without departing from the spirit thereof, and we desire, therefore, that only such limitations shall be placed thereupon as are set forth in the appended claims.

What we claim is:

1. The process of producing ammoniated phosphate in which substantially all of the $P_2O_5$ is available from acidulated phosphate rock in the presence of fluorine remaining in the rock after acidulation which comprises, acidulating the rock with sulfuric acid in the proportion of 1.77 pounds to 2.06 pounds $H_2SO_4$ to each pound of $P_2O_5$ in the rock and with sufficient water to form a moist product, allowing the acidulated rock to age without substantial drying for at least a week, whereby it will contain after aging in excess of 6% moisture, and adding ammonia to the acidulated rock to produce a product having in excess of 6.5 parts ammonia to 20 parts $P_2O_5$ while maintaining the temperature during ammoniation below 75° C.

2. A process as set forth in claim 1 in which the acidulated rock is aged at a temperature above 80° C.

3. The process of producing a fertilizer containing essentially ammonium sulfate and citrate soluble calcium phosphate more basic than dicalcium phosphate which comprises acidulating phosphate rock with sulfuric acid to convert substantially all the $P_2O_5$ to water soluble form and with sufficient water to form a moist product, aging the acidulated product without substantial drying for at least a week whereby after aging the product contains in excess of 6% moisture, and adding ammonia to react with substantially 80% of the acid employed to acidulate the rock while maintaining the temperature of the mix below 75° C.

4. A process as set forth in claim 4 in which the product is ammoniated to the extent that the ratio of Ca to $P_2O_5$ in the calcium phosphate is substantially that in tricalcium phosphate.

5. The process of producing a fertilizer containing essentially ammonium sulfate and citrate soluble calcium phosphate more basic than dicalcium phosphate which comprises acidulating phosphate rock containing fluorine with sulfuric acid of 55% to 75% $H_2SO_4$ in an amount to produce a moist mixture in which over 85% of the $P_2O_5$ in the rock is converted to water soluble phosphate, aging the moist mixture for at least a week without substantial drying whereby after aging it contains from 6% to 25% moisture, at a temperature in the neighborhood of 80° C., cooling the mixture, adding ammonia up to 12 parts by weight to 20 parts by weight of $P_2O_5$ in the product while maintaining the temperature below 75° C., and drying.

6. The process of producing a phosphatic fertilizer in which the $P_2O_5$ is substantially all available which comprises acidulating phosphate rock containing fluorine with sulfuric acid in the presence of water in an amount to produce a moist product in which substantially all the $P_2O_5$ in the rock is converted to water soluble phosphate, aging the product for at least a week at a temperature in the neighborhood of 80° C., there being from 6% to 25% moisture in the product after aging, adding ammonia in the presence of the fluorine remaining in the acidulated rock while maintaining the temperature below 75° C. and in an amount sufficient to produce a product comprising essentially citrate soluble calcium phosphate more basic than dicalcium phosphate and ammonium sulfate, and drying the product at a temperature of from 45° C. up to the neighborhood of 100° C.

7. The process of producing an ammoniated phosphatic fertilizer in which the $P_2O_5$ content is substantially all available from phosphate rock having approximately 34% $P_2O_5$ and containing 3% or more fluorine which comprises reacting approximately 70 pounds sulfuric acid with 100 pounds phosphate rock in the presence of sufficient water to produce a moist mixture in which the $P_2O_5$ is substantially all water soluble, aging the mixture without substantial drying at a temperature in the neighborhood of 80° C. for at least a week, there being from 6% to 25% moisture in the mixture after aging, cooling the mixture to a temperature below 75° C., adding ammonia to the fluorine containing mixture in an amount up to that sufficient to neutralize all of the acidic hydrogen in the mixture while maintaining the temperature below 75° C., and drying the product.

8. A process for the production of ammoniated phosphate fertilizer of high $P_2O_5$ availability from phosphate rock containing around 30% to 35% $P_2O_5$, which comprises acidulating the rock with sulfuric acid in the proportions of from 60 to 75 pounds $H_2SO_4$ to 100 pounds of phosphate rock in the presence of sufficient water to form a moist mixture, aging the acidulated mix without substantial drying for at least a week, whereby after aging the mixture contains from 6% to 25% moisture, cooling the mixture to a temperature below 75° C., adding ammonia to the aged mix in an amount from 6.5 parts per 20 parts $P_2O_5$ up to an amount to react with substantially all of the acidic hydrogen therein while maintaining the mixture at a temperature below 75° C., and drying the mixture.

9. A process as set forth in claim 8 in which the acidulated product is aged at a temperature of from 85° to 95° C., and after ammoniation is dried at temperatures up to 100° C.

10. A process as set forth in claim 9 in which the aged acidulated phosphate rock is cooled to a temperature in the neighborhood of 40° C. before ammoniation.

11. A process as set forth in claim 9 in which around 12 parts per 100 each of calcium sulfate and ammonium sulfate were added to the acidulated phosphate rock before ammoniation.

References Cited in the file of this patent

UNITED STATES PATENTS

| | | |
|---|---|---|
| 709,185 | Terne | Sept. 16, 1902 |
| 1,122,183 | Willson et al. | Dec. 22, 1914 |
| 1,870,602 | Case | Aug. 9, 1932 |
| 1,930,883 | Oehme | Oct. 17, 1933 |
| 2,060,310 | Harvey | Nov. 10, 1936 |
| 2,077,171 | Harvey | Apr. 13, 1937 |
| 2,116,866 | Kniskern | May 10, 1938 |
| 2,136,793 | Gabeler et al. | Nov. 15, 1938 |

UNITED STATES PATENT OFFICE
CERTIFICATION OF CORRECTION

Patent No. 2,976,140                  March 21, 1961

John N. Carothers et al.

It is hereby certified that error appears in the above numbered patent requiring correction and that the said Letters Patent should read as corrected below.

Column 11, line 19, for the claim reference numeral "4" read -- 3 --; column 12, line 35, for the claim reference numeral "9" read -- 8 --; line 38, for the claim reference numeral "9" read -- 8 --.

Signed and sealed this 29th day of August 1961.

(SEAL)
Attest:

ERNEST W. SWIDER
Attesting Officer

DAVID L. LADD
Commissioner of Patents